(12) United States Patent
Landry et al.

(10) Patent No.: US 8,095,710 B2
(45) Date of Patent: Jan. 10, 2012

(54) SYSTEM AND METHOD OF PROVIDING ELECTRICAL ISOLATION

(75) Inventors: Matthew Landry, Austin, TX (US);
Phillip Callahan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 585 days.

(21) Appl. No.: 12/164,618

(22) Filed: Jun. 30, 2008

(65) Prior Publication Data

US 2009/0327558 A1    Dec. 31, 2009

(51) Int. Cl.
*G06F 13/00* (2006.01)
*G06F 13/38* (2006.01)

(52) U.S. Cl. .......................... 710/71; 710/301

(58) Field of Classification Search ............ 370/464, 370/498, 352, 535; 710/1, 71, 301
See application file for complete search history.

(56) References Cited

U.S. PATENT DOCUMENTS

| | | | |
|---|---|---|---|
| 4,434,474 A | 2/1984 | Best et al. | 364/900 |
| 4,495,603 A | 1/1985 | Varshney | 365/233 |
| 4,534,039 A | 8/1985 | Dodds et al. | 375/36 |
| 4,628,480 A | 12/1986 | Floyd | 55/282 |
| 4,677,646 A | 6/1987 | Dodds et al. | 375/36 |
| 5,121,284 A | 6/1992 | Onodera et al. | 361/152 |
| 5,369,687 A | 11/1994 | Farkas | 379/98 |
| 5,875,235 A | 2/1999 | Mohajeri | 379/93.36 |
| 6,107,948 A | 8/2000 | Scott et al. | 341/143 |
| 6,191,717 B1 | 2/2001 | Scott et al. | 341/143 |
| 6,304,597 B1 | 10/2001 | Dupuis et al. | 375/222 |
| 6,351,530 B1 | 2/2002 | Rahamim et al. | 379/399.01 |
| 6,359,973 B1 | 3/2002 | Rahamim et al. | 379/93.05 |
| 6,359,983 B1 | 3/2002 | Krone et al. | 379/399.01 |
| 6,389,061 B1 | 5/2002 | Scott et al. | 375/220 |
| 6,430,229 B1 | 8/2002 | Scott et al. | 375/285 |
| 6,611,553 B1 | 8/2003 | Scott et al. | 375/220 |
| 6,647,101 B2 | 11/2003 | Rahamim et al. | 379/93.05 |
| 6,724,891 B1 | 4/2004 | Huang et al. | 379/399.01 |
| 6,735,246 B1 | 5/2004 | Dupuis et al. | 375/222 |
| 6,751,315 B1 | 6/2004 | Liu et al. | 379/413.02 |
| 6,819,169 B1 | 11/2004 | Kunc et al. | 327/560 |
| 6,826,225 B1 | 11/2004 | Dupuis et al. | 375/222 |
| 6,870,046 B2 | 3/2005 | Bennett et al. | 536/24.5 |
| 7,016,490 B2 | 3/2006 | Beutler et al. | 379/412 |
| 7,020,187 B1 | 3/2006 | Reid et al. | 375/220 |
| 7,031,458 B2 | 4/2006 | Holcombe et al. | 379/399.02 |
| 7,088,803 B2 | 8/2006 | Rahamim et al. | 379/93.05 |

(Continued)

OTHER PUBLICATIONS

Non-Final Office Action for U.S. Appl. No. 12/164,624, 12 pages.

*Primary Examiner* — Chi Pham
*Assistant Examiner* — Robert Lopata
(74) *Attorney, Agent, or Firm* — Polansky & Associates, P.L.L.C.; Ronald Michael Reed (57) ABSTRACT

In a particular embodiment, a power sourcing equipment (PSE) device is disclosed that includes a plurality of network input/output (I/O) interfaces adapted to physically and electrically connect to a respective plurality of cables. The PSE device further includes a plurality of driver circuits. Each driver circuit of the plurality of driver circuits is coupled to a respective network I/O interface of the plurality of network I/O interfaces to send and receive data via a respective cable of the respective plurality of cables. Further, the PSE device includes a shared isolation barrier to electrically isolate control circuitry from the plurality of driver circuits.

22 Claims, 6 Drawing Sheets

U.S. PATENT DOCUMENTS

| | | | |
|---|---|---|---|
| 7,154,940 B2 | 12/2006 | Scott et al. | 375/220 |
| 7,200,167 B2 | 4/2007 | Scott et al. | 375/220 |
| 7,203,224 B2 | 4/2007 | Scott et al. | 375/220 |
| 7,269,210 B2 | 9/2007 | Liu | 375/222 |
| 7,272,669 B2 * | 9/2007 | Mattur et al. | 710/16 |
| 7,283,584 B2 | 10/2007 | Scott et al. | 375/220 |
| 7,292,600 B2 | 11/2007 | Binder | |
| 7,301,995 B2 | 11/2007 | Scott et al. | 375/220 |
| 7,356,588 B2 | 4/2008 | Stineman, Jr. et al. | 709/224 |
| 7,536,566 B2 | 5/2009 | Hemmah et al. | |
| 7,685,440 B2 * | 3/2010 | Blaha et al. | 713/300 |
| 7,685,452 B2 * | 3/2010 | Camagna et al. | 713/340 |
| 7,711,967 B2 * | 5/2010 | Woo et al. | 713/300 |
| 2002/0126806 A1 | 9/2002 | Rahamim et al. | 379/93.05 |
| 2002/0136395 A1 | 9/2002 | Saksa et al. | 379/412 |
| 2002/0172351 A1 | 11/2002 | Beutler et al. | 379/399.01 |
| 2002/0181675 A1 | 12/2002 | Venkataraman et al. | 379/93.01 |
| 2003/0091183 A1 | 5/2003 | Holcombe et al. | 379/399.01 |
| 2003/0179818 A1 | 9/2003 | D'Angelo et al. | 375/222 |
| 2003/0206626 A1 | 11/2003 | Scott et al. | 379/413 |
| 2005/0036604 A1 | 2/2005 | Scott et al. | 379/413 |
| 2005/0097369 A1 * | 5/2005 | Bowser et al. | 713/300 |
| 2006/0008075 A1 | 1/2006 | Scott et al. | 379/399.01 |
| 2006/0075173 A1 | 4/2006 | Mattur et al. | 710/301 |
| 2006/0117089 A1 | 6/2006 | Karam | |
| 2006/0133598 A1 | 6/2006 | Pagnanelli | 379/406.08 |
| 2006/0133599 A1 | 6/2006 | Pagnanelli | 379/406.08 |
| 2006/0164108 A1 * | 7/2006 | Herbold | 324/691 |
| 2006/0268898 A1 | 11/2006 | Karam | 370/401 |
| 2007/0003052 A1 | 1/2007 | Hein et al. | 379/399.01 |
| 2007/0003055 A1 | 1/2007 | Bark et al. | 379/413 |
| 2007/0011547 A1 | 1/2007 | Karam | 714/746 |
| 2007/0019445 A1 | 1/2007 | Blaha et al. | 363/21.12 |
| 2007/0121832 A1 | 5/2007 | Ghoshal | 379/93.36 |
| 2007/0132487 A1 * | 6/2007 | Kestelli | 327/108 |
| 2007/0147354 A1 * | 6/2007 | He | 370/352 |
| 2007/0259644 A1 | 11/2007 | Chan et al. | |
| 2007/0263852 A1 | 11/2007 | Schley-May et al. | 379/413 |
| 2008/0080105 A1 | 4/2008 | Blaha et al. | 361/38 |
| 2008/0181316 A1 | 7/2008 | Crawley et al. | |
| 2008/0238447 A1 * | 10/2008 | de la Torre Vega et al. | 324/676 |
| 2008/0238656 A1 | 10/2008 | de la Torre Vega et al. | |
| 2008/0267212 A1 * | 10/2008 | Crawley et al. | 370/463 |
| 2009/0158377 A1 | 6/2009 | Diab et al. | |
| 2010/0201188 A1 * | 8/2010 | Robbins | 307/1 |
| 2010/0218003 A1 * | 8/2010 | Blaha et al. | 713/300 |

* cited by examiner

SYSTEM AND METHOD OF PROVIDING ELECTRICAL ISOLATION

FIELD OF THE DISCLOSURE

The present disclosure is generally related to a system and method of providing electrical isolation. More particularly, the present disclosure relates to a power sourcing equipment device including electrical isolation.

BACKGROUND

In general, Power over Ethernet (PoE), which is outlined in IEEE Std 802.3™-2005 clause 33 (the PoE standard), refers to a technique for delivering power and data to an electronic device via Ethernet cabling. In a PoE system, a power sourcing equipment (PSE) device provides a power supply to electronic devices, which may be referred to as powered devices (PDs), via an input/output (I/O) network interface that couples to an Ethernet cable. An example of such an I/O network interface is an RJ-45 connector. PoE eliminates the need for a separate power source to deliver power to attached powered devices. Such powered devices may include Voice over Internet Protocol (VoIP) telephones, wireless routers, security devices, field devices to monitor process control parameters, data processors, other electronic devices, or any combination thereof.

In general, the PoE standard requires the chassis and data circuitry of the PSE device to be electrically isolated from the I/O network interfaces and from other interfaces that are user accessible, including a metal housing, a display, a touch screen, a switch, a screw, another connector, or any combination thereof. Conventionally, each I/O network interface is isolated from a physical transport circuitry (PHY) by a transformer that provides such electrical isolation. In a system that has multiple I/O network interfaces, a corresponding number of transformers are used to provide isolation. Each transformer adds cost and contributes to the size of the circuit. Hence, there is a need for improved and/or simplified electrical isolation circuitry.

SUMMARY

In a particular embodiment, a power sourcing equipment (PSE) device is disclosed that includes a plurality of network input/output (I/O) interfaces adapted to physically and electrically connect to a respective plurality of cables. The PSE device further includes a plurality of driver circuits. Each driver circuit of the plurality of driver circuits is coupled to a respective network I/O interface of the plurality of network I/O interfaces to send and receive data via a respective cable of the respective plurality of cables. Further, the PSE device includes a shared isolation barrier to electrically isolate control circuitry from the plurality of driver circuits.

In another particular embodiment, a system is disclosed that includes a network I/O interface adapted to couple to an Ethernet cable having multiple wires to carry power and data. The system further includes a physical transport (PHY) circuit including transmit and receive circuitry coupled to the network I/O interface via multiple wire pairs to send and receive data via the Ethernet cable and includes a power supply circuit coupled to the network I/O interface and adapted to apply power to the Ethernet cable via the network I/O interface. The system also includes an isolation barrier coupled between the PHY circuit and media access control (MAC) circuitry to electrically isolate the MAC circuitry from the PHY circuit without isolating the PHY circuit from the network I/O interface.

In still another particular embodiment, a method of providing electrical isolation is disclosed that includes sending data to a powered device via an input/output (I/O) interface using a transceiver circuit and concurrently providing a power supply to the powered device via the I/O interface. The method further includes electrically isolating the transceiver circuit from a control circuit via a digital isolation barrier circuit coupled between the transceiver circuit and the control circuit.

DETAILED DESCRIPTION OF ILLUSTRATIVE EMBODIMENTS

Figure 1:
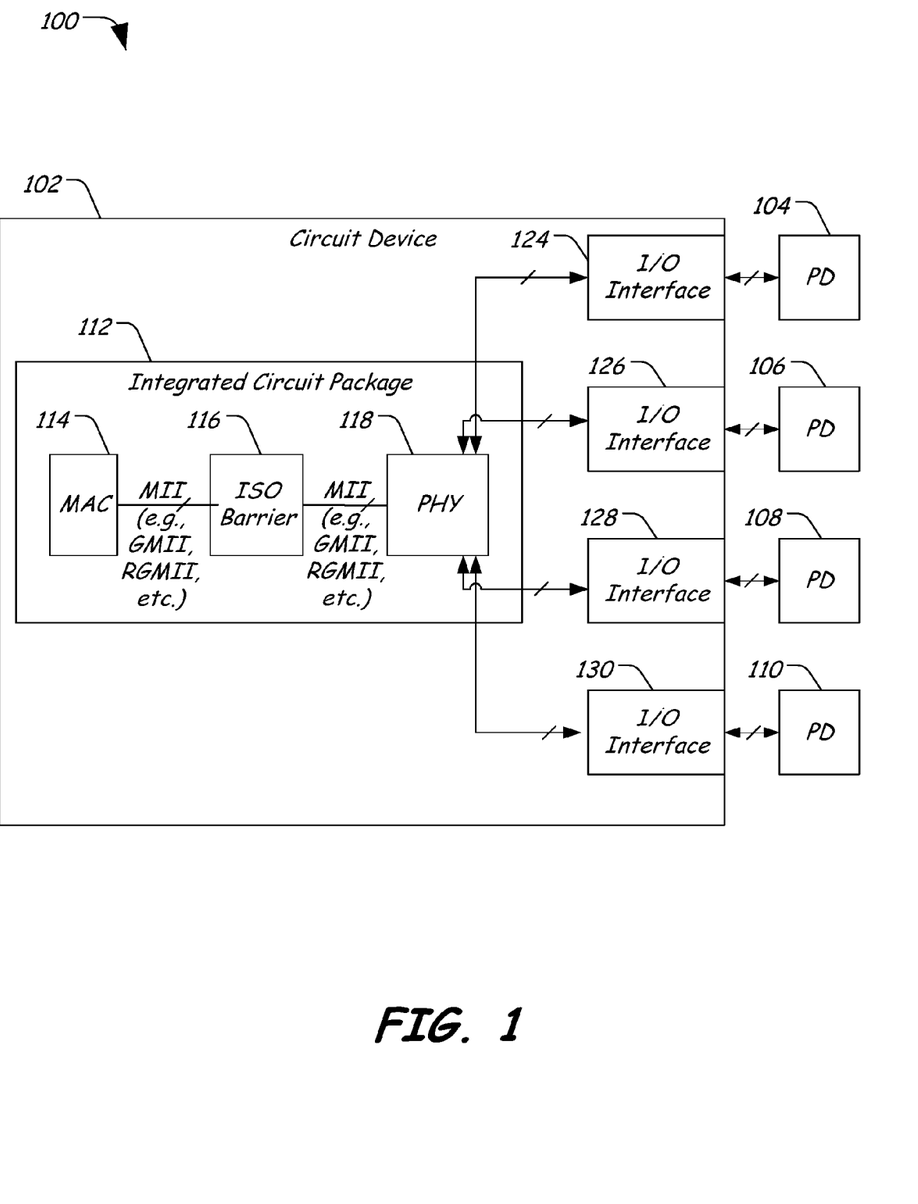
FIG. 1 is a block diagram of a particular illustrative embodiment of a system to provide electrical isolation.

FIG. 1 is a block diagram of a particular illustrative embodiment of a system 100 to provide electrical isolation. The system 100 includes a circuit device 102 that communications with multiple powered devices 104, 106, 108, and 110. In a particular embodiment, the circuit device 102 is a power sourcing equipment device adapted to provide power and data to the powered devices 104, 106, 108, and 110. In a particular example, the powered devices 104, 106, 108, and 110 can be power over Ethernet (PoE) enabled devices, and the circuit device 102 can be adapted to provide power and data to the powered devices 104, 106, 108, and 110 according to their respective power classifications, as defined by a standard, such as the IEEE Std 802.3™-2005 clause 33 (the PoE standard), by a power over broadband standard, by another standard, by a proprietary power/signaling protocol, or any combination thereof.

The circuit device 102 includes an integrated circuit 112, which has a media access control circuit 114 coupled to a physical transport layer (PHY) circuit 118 via an isolation barrier 116. In a particular embodiment, the isolation barrier 116 is a digital isolation barrier (for GMII or RGMII implementations) or an analog isolation barrier (for SerDes interface implementations) that has a high data rate and that is adapted to be shared by multiple channels, multiple PHY circuits, or any combination thereof. The PHY circuit 118 is adapted to communicate data to and receive data from one or more of the powered devices 104, 106, 108, and 110 via respective input/output (I/O) interfaces 124, 126, 128, and 130.

In a particular embodiment, the PHY circuit 118 and the MAC circuit 114 communicate data to the isolation barrier 116 using a media independent interface (MII) communications protocol (e.g., GMII or RGMII for digital implementations), while the I/O interfaces 124, 126, 128, and 130 communicate with the powered devices 104, 106, 108, and 110 using a media dependent communications protocol, such as an Ethernet protocol. The isolation barrier 116 can include circuitry, such as a multiplexer circuit (e.g., GMII or RGMII implementations) or a serializer/deserializer (SERDES) circuit (analog implementations), to convert the MII protocol data from the multi-channel PHY circuit 118 to a serial data stream and to transfer the serial data stream across the isolation barrier 116 to the MAC circuit 114, and vice versa. In a particular example, the isolation barrier 116 is a high speed digital isolation barrier (for GMII or RGMII implementations), such as a capacitor, a pulse transformer, an optical isolator, a radio frequency isolator, another high speed digital isolator, or any combination thereof.

In a particular example, the isolation barrier 116 can be much smaller than an analog transformer circuit. Further, by sharing the isolation barrier 116 between the multiple channels of the PHY circuit 118, the overall size of the integrated circuit package 112 is reduced relative to a circuit that included transformers for each channel.

Figure 2:
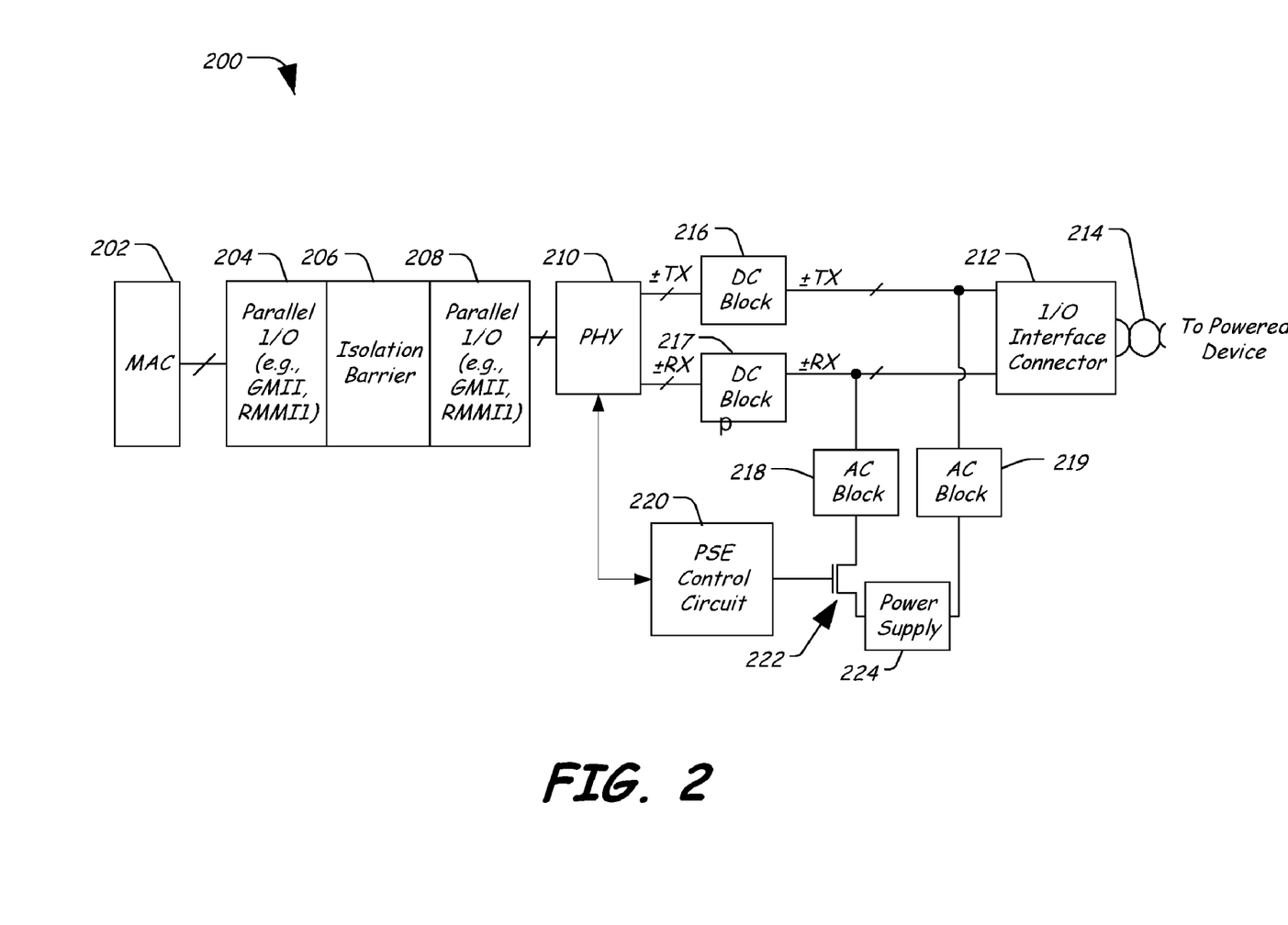
FIG. 2 is a block diagram of a second particular illustrative embodiment of a system to provide electrical isolation.

FIG. 2 is a block diagram of a second particular illustrative embodiment of a system 200 of providing electrical isolation. The system 200 includes a media access control (MAC) circuit 202 that is adapted to communicate with one or more other circuits, such as a power sourcing equipment (PSE) device control circuit. The system 200 also includes a parallel input/output (I/O) interface 204 to enable transmitting and receiving data to and from the MAC circuit 202. The parallel I/O 204 is coupled to an isolation barrier 206. In a particular embodiment, the isolation barrier 206 can be an analog isolation barrier, such as a transformer circuit. In another particular embodiment, the isolation barrier 206 can be a digital isolation barrier, such as a capacitor, an optical coupling circuit, a radio frequency circuit, a pulse transformer circuit, another electrical isolation circuit, or any combination thereof. In a particular embodiment, the isolation barrier 206 has a high data rate digital output. The isolation barrier 206 is coupled to a second parallel I/O interface 208, which is coupled to a physical transport layer (PHY) circuit 210 via a media independent interface (MII). The PHY circuit 210 is a multi-channel circuit that is coupled to an input/output (I/O) interface connector 212 via multiple wires including a plus and minus transmit (±TX) wire pair and a plus and minus receive (±RX) wire pair. The I/O interface connector 212 is adapted to communicate power and data to a powered device via a cable 214, such as a twisted pair Ethernet cable. In a particular embodiment, there may be a plurality of transmit and receive wire pairs coupled to the I/O interface connector 212. In a particular example, a 100 Megabits per second (Mbps) Ethernet connection has a single transmit wire pair and a single receive wire pair. In another particular example, a 1000 Mbps Ethernet connection has four wire pairs, which are each available for transmit and receive.

In a particular embodiment, the PHY circuit 210 is coupled to the I/O interface connector 212 via direct current (DC) block circuits 216 and 217, which may include a capacitor to prevent a DC signal from reaching the PHY circuit 210 from the I/O interface connector 212. Further, the system 200 includes a power sourcing equipment (PSE) control circuit 220 that selectively couples a power supply 224 to the plus and minus transmit (±TX) wire pair and the plus and minus receive (±RX) wire pairs by selectively activating a switch 222. Further, the system 200 includes alternating current (AC) block circuits 218 and 219 to prevent AC signal interference with data on the plus and minus transmit (±TX) wire pair and the plus and minus receive (±RX) wire pairs. In a particular example, the AC block circuits 218 and 219 are choke circuits to prevent interference from power supply noise. Additionally, the AC block circuits 218 and 219 also prevent data (AC) signals at the transmit and receive wire pairs from being shunted to an AC ground in the power supply.

As shown, the isolation barrier 206 isolates the MAC circuitry 202 from the PHY circuit 210, but does not isolate the PHY circuit 210 from the I/O interface connector 212. Thus, overall power consumption by the PHY circuit 210 is reduced, since the PHY circuit 210 does not need to drive data across inductors or other power consuming components of the isolation barrier 206. Further, the DC block circuits 216 and 217 can be formed using small capacitors that can be readily formed on a circuit substrate. Additionally, the AC block circuits 218 and 219 can be formed from small inductor components to block power supply noise from the power supply 224. The DC block circuits 216 and 217 and the AC block circuits 218 and 219 consume less circuit area than multiple transformer circuits would consume. Further, in a particular embodiment, the parallel I/O interfaces 204 and 208 can be used to multiplex data from multiple PHY circuits, allowing the isolation barrier 206 to be shared, thereby conserving additional circuit real estate. In a particular embodiment, the SERDES circuits 204 and 208 can take media independent (MII) signals and transport the MII signals more efficiently across the isolation barrier 206. In particular, the isolation barrier can be a digital isolation barrier, such as a capacitor or another digital isolation barrier, and the parallel I/O interfaces 204 and 208 can transmit the MII signals more efficiently across the digital isolation. In a particular example, the parallel I/O interfaces 204 and 208 are adapted to transmit and receive data via a media independent interface (MII), such as a Gigabit MII (GMII), a Reduced GMII (RGMII), or another high speed media independent interface.

In a particular embodiment, the system 200 can include multiple network I/O interfaces, such as the I/O interface connector 212, and a plurality of PHY circuits, such as the PHY circuit 210. In this example, each of the multiple network input/output (I/O) interfaces is adapted to physically and electrically connect to a respective cable of the plurality of cables, such as the cable 214. The plurality of PHY circuits is adapted to transmit data to and receive data from the plurality of network I/O interfaces to send and receive data via a respective cable of the respective plurality of cables. The system 200 also includes an isolation barrier 206 that can be coupled between and shared by the plurality of PHY circuits and control circuitry to provide electrical isolation between the plurality of PHY circuits and the control circuitry.

In general, most PHY circuits, such as the PHY circuit 210, are multi-channel devices. While conventional isolation is provided using a transformer for each TX or RX pair in each channel, moving the isolation barrier 206 behind the PHY circuit 210 allows for elimination of multiple transformers, since the single isolation barrier 206 can provide isolation for each of the channels of the PHY circuit 210. Further, since many PHY circuits are multi-channel, the parallel I/O interfaces 204 and 208 (or multiplexer circuits) can be used to allow multiple PHY circuits to share the isolation barrier 206, which multiplies both the circuit and cost savings of reducing the number of transformers. In a particular example, communications between the MAC circuit 202 and the PHY circuit 210 can occur via a single, bi-directional data bus via the isolation barrier 206.

In certain Ethernet system implementations, a specific minimum inductance transformer can be used to prevent a phenomena that is referred to as "base-line wander" (BLW). Base-line wander generally refers to an electrical phenomena where specific data signal patterns cause a DC bias current to develop within the transformer. If the transformer does not meet specific performance requirements, the data channel can be corrupted by this DC bias current. By moving the isolation barrier behind the PHY circuit and eliminating the transformer, the source of such base-line wander is eliminated, resulting in more reliable Ethernet interfaces. Further, since the base-line wander is eliminated, PHY circuit designers can optionally omit circuit blocks and/or filters used to compensate for BLW.

Figure 3:
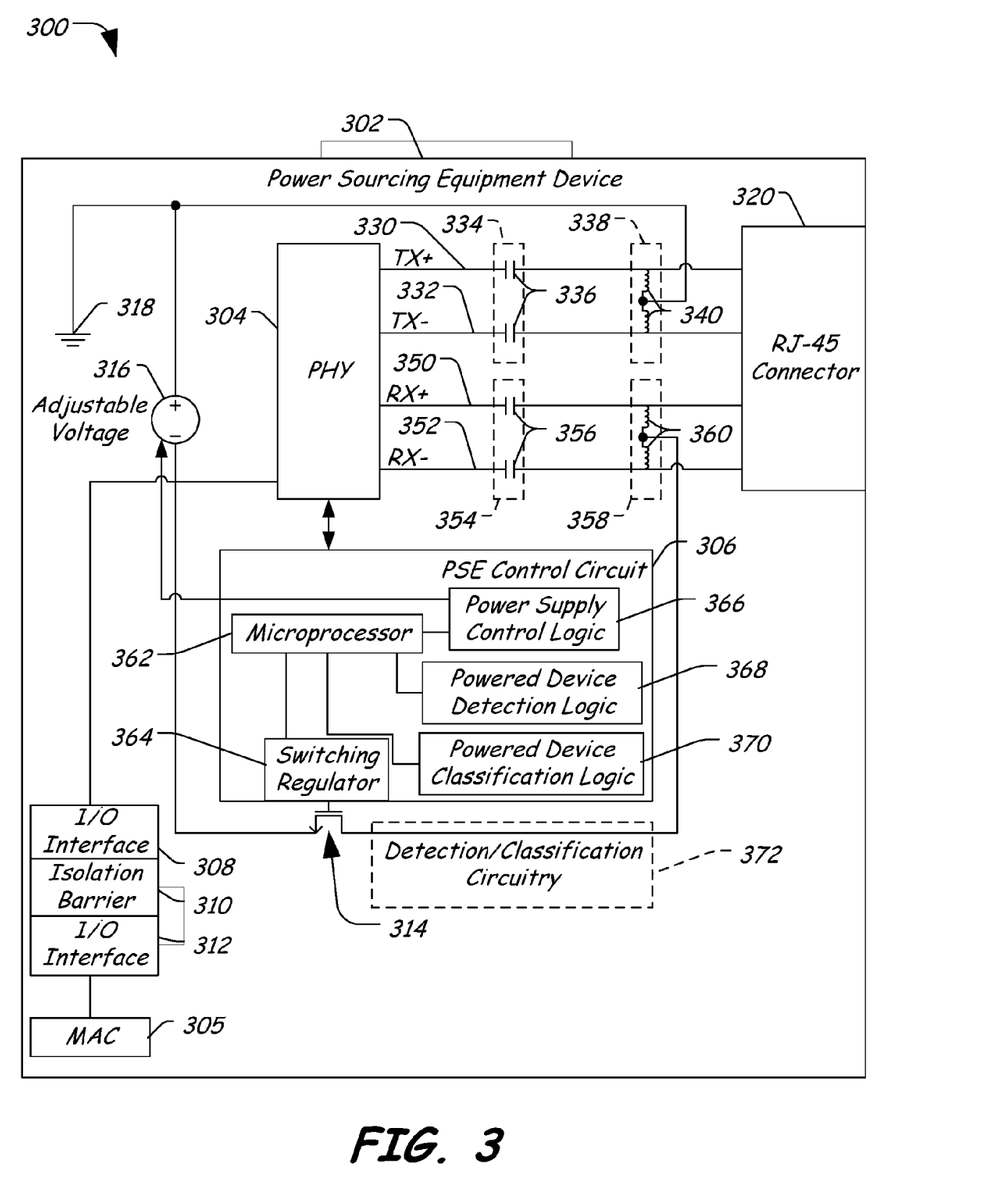
FIG. 3 is a block diagram of a third particular illustrative embodiment of a system to provide electrical isolation.

FIG. 3 is a block diagram of a third particular illustrative embodiment of a system 300 of providing electrical isolation. The system 300 includes a power sourcing equipment (PSE) device 302 that is adapted to communicate power and data to a powered device. The PSE device 302 includes a physical transport (PHY) circuit 304 that is adapted to communicate data to and receive data from a physical transport medium. The PHY circuit 304 is coupled to a PSE control circuit 306. Further, the PHY circuit 304 is coupled to a media access control (MAC) circuit 305 via an isolation barrier 310. While only one PHY circuit 304 is shown, it should be understood that the PSE device 302 can include multiple PHY circuits.

In a particular example, a first input/output (I/O) interface circuit 308 and a second I/O interface circuit 312 can be used to serialize and de-serialize data from and to multiple communication paths, such as transmit lines 330 and 332 and receive lines 350 and 352. In a particular embodiment, the I/O interface circuits 308 and 312 can be serializer/deserializer (SerDes) circuits for analog implementations. In another particular embodiment, the I/O interface circuits 308 and 312 can be parallel media independent interfaces, such as GMII, RGMII, or other high speed I/O interfaces for digital implementations. In a particular example, the isolation barrier 310 includes a digital isolation circuit, such as a capacitor, a radio frequency circuit, a pulse transformer, another digital isolation circuit, or any combination thereof. The second I/O interface circuit 312 is coupled to the MAC circuit 305. In a particular embodiment, the PSE control circuit 306 can be combined with the PHY circuit 304 in a single integrated circuit package. In this particular example, the PHY circuit 304 and the PSE circuit 306 can be on the same side of the isolation barrier 310, and the MAC circuit 305 can be electrically isolated from the PHY circuit 304 and the PSE circuit 306.

The PSE control circuit 306 is coupled to a switch 314 (such as a switching field effect transistor (FET)) and is adapted to selectively activate the switch 314 to apply power from a power source (or power supply) 316 to positive and negative transmit lines 330 and 332 and to positive and negative receive lines 350 and 352 via choke circuits 338 and 358. In a particular embodiment, a positive terminal of the power source 316 is coupled to electrical ground 318 to reference the supply voltage as a negative voltage power supply (i.e., −48 volts). The PHY circuit 304 is coupled to an input/output (I/O) interface connector, such as an RJ-45 connector 320, via positive and negative transmit lines 330 and 332 and via a direct current (DC) block circuit 334, which includes capacitors 336. The DC block circuit 334 prevents a DC signal from reaching the PHY 304 via the lines 330 and 332. Additionally, the power supply 316 is coupled to the lines 330 and 332 via a choke circuit 338, which includes inductors 340 coupled in series between the positive and negative transmit lines 330 and 332. The choke circuit 338 blocks alternating current (AC) signals from the power source 316 from reaching the positive and negative transmit lines 330 and 332. In particular, the choke circuit 338 prevents power supply noise generated by the power source 316 from interfering with data on the positive and negative transmit lines 330 and 332. The choke circuit 338 also prevents data signals from being shunted to the power supply 316, which can be an AC ground.

The PHY circuit 304 is coupled to the RJ-45 connector 320 via positive and negative receive lines 350 and 352 and via a DC block circuit 354, which includes capacitors 356. The DC block circuit 356 prevents a DC signal from reaching the PHY 304 via the lines 350 and 352. Additionally, the power supply 316 is coupled to the lines 350 and 352 via a choke circuit 358, which includes inductors 360 coupled in series between the positive and negative receive lines 350 and 352. In particular, the choke circuit 358 blocks AC signals from the power source 316 from interfering with data on the positive and negative receive lines 350 and 352. Further, the choke circuit 358 prevents data signals from being shunted to the power supply 316.

In a particular embodiment, the PSE control circuit 306 includes a microprocessor 362 that is coupled to a switching regulator 364, which is adapted to selectively activate the switch 314. In a particular example, the microprocessor 362 controls the switch 314 according to data received via the PHY circuit 304. Additionally, the PSE control circuit 306 includes power supply control logic 366 to control application of a particular power supply level to the positive and negative transmit and receive lines 330, 332, 350 and 352. In a particular example, the power supply control logic 366 includes instructions executable by the microprocessor 362 to access the powered device detection logic 368 and the powered device classification logic 370. In a particular example, the powered device detection logic 368 is adapted to apply a detection signal to the positive and negative transmit lines 330 and 332 or to the positive and negative receive lines 350 and 352 and to monitor a responsive signal on the other lines. In another particular embodiment, a hardware state-machine may be used to make control decisions, replacing the microprocessor 362.

When a responsive signal is received, the powered device detection logic 368 is used to determine if the responsive signal indicates the presence of a powered device coupled to the RJ-45 connector 320. If so, the powered device classification logic can be used to control the switch 314 to apply a classification signal to the positive and negative transmit lines 330 and 332 or to the positive and negative receive lines 350 and 352 and to monitor a responsive classification signal on the other lines. A power level for the detected powered device can be determined based on the responsive classification signal, and the power supply control logic is adapted to control the power supply 316 to provide a desired power supply to the positive and negative transmit and receive lines 330, 332, 350, and 352 according to the determined powered device classification. In a particular embodiment, a separate detection and/or classification circuit, such as the detection/classification circuit 372, can be coupled to the drain of the switch (FET) 314. In this instance, the switch 314 remains off while the detection/classification circuit 372 asserts detection or classifications signals on at least one of the lines 330, 332, 350, and 352. When the detection/classification process is complete, the detection/classification circuit 372 can be disabled and the switch 314 can be activated to supply power to at least one of the pairs of lines 330, 332, 350, and 352.

In another particular embodiment, the power source 316 is adjustable and is controllable by the PSE control circuit 306 to inject a selected direct current power supply onto the lines 330, 332, 350 and 352 via the choke circuits 338 and 358. In a particular embodiment, the PSE control circuit 306 is adapted to control the power supply 316 to provide different voltage levels to different powered devices.

In a particular embodiment, the PHY circuit 304 is a multi-channel circuit and the I/O interface circuits 308 and 312 cooperate to serialize and deserialize data from the multiple channels so that communication between the PHY circuit 304 and the MAC circuit 305 can occur via a single, bi-directional data bus. Moving the isolation barrier 310 behind the PHY circuit 304 reduces the number of isolation barriers, reducing circuit area and costs.

Figure 4:
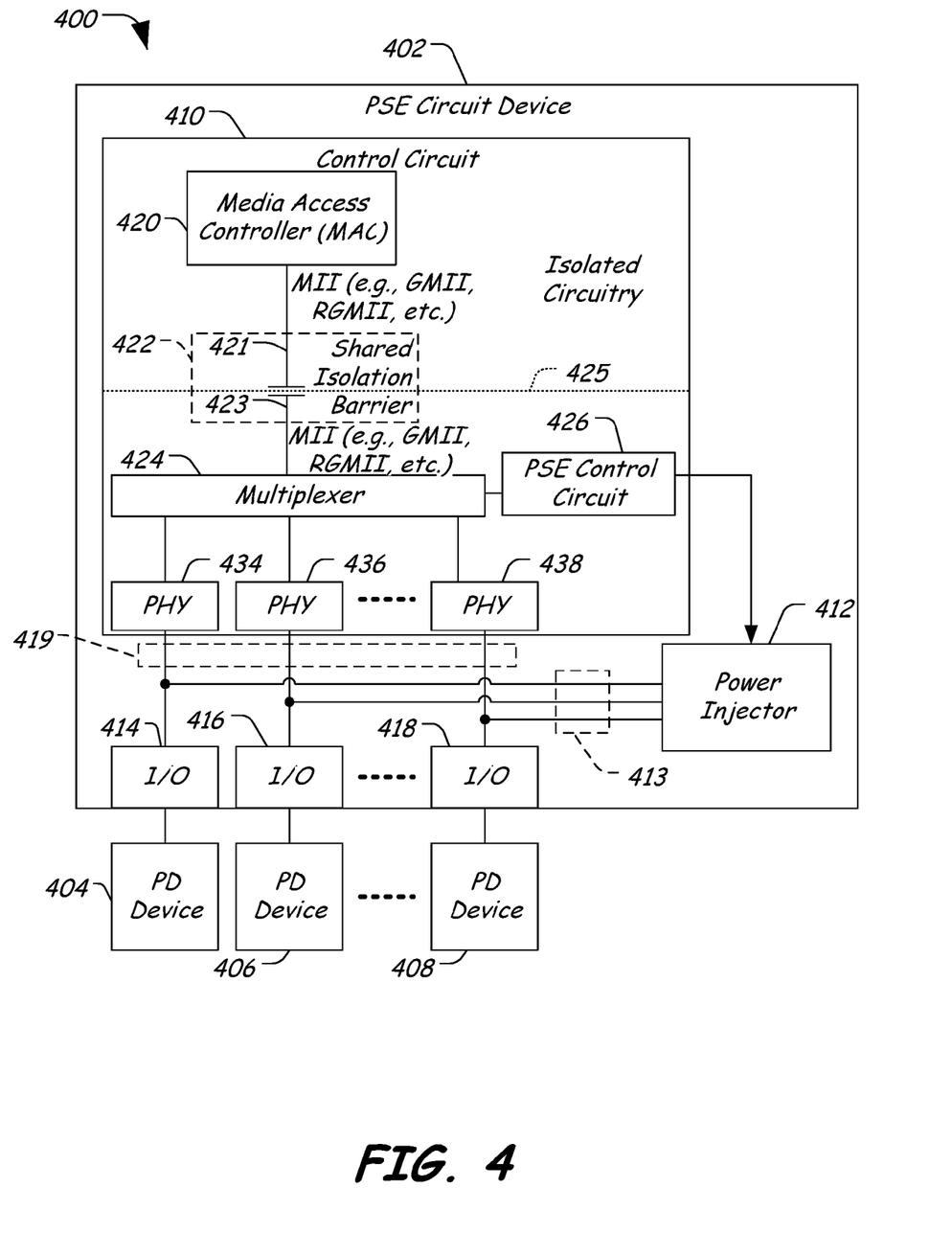
FIG. 4 is a block diagram of a fourth particular illustrative embodiment of a system to provide electrical isolation.

FIG. 4 is a block diagram of a fourth particular illustrative embodiment of a system 400 of providing electrical isolation. The system 400 includes a power sourcing equipment (PSE) circuit device 402, which is adapted to provide power and data to multiple powered devices (PDs) 404, 406, and 408. As used herein, the term "powered device" refers to an electronic device or circuit that receives power and data via a common cable. The PSE circuit device 402 includes a control circuit 410 that is coupled to multiple input/output (I/O) interface ports 414, 416, and 418, which correspond to the multiple powered devices 404, 406, and 408, respectively. Additionally, the PSE circuit device 402 includes a power injector circuit 412 that is adapted to provide power to the multiple powered devices 404, 406, and 408 via the respective I/O interface ports 414, 416, and 418. Further, the PSE circuit device 402 includes a direct current (DC) block circuit 419 to block DC signals from reaching the control circuit 410. Additionally, the PSE circuit device 402 includes an alternating current (AC) block circuit 413 to block power supply noise from the power injector 412 from interfering with data signals between the control circuit 410 and the I/O interface ports 414.

The control circuit 410 includes a media access controller (MAC) circuit 420 that is adapted to communicate with multiple physical transport (PHY) circuits 434, 436, and 438 via a multiplexer 424 and a shared isolation barrier 422. In a particular example, the MAC circuit 420 may include a de-multiplexer. Each of the PHY circuits 434, 436, and 438 is coupled to a respective I/O interface circuit 414, 416, and 418 to send and receive data to the respective powered devices 404, 406, and 408. The control circuit 410 also includes a power sourcing equipment (PSE) control circuit 426 that is adapted to communicate with the power injector 412 to control a power supply provided to each of the powered devices 404, 406, and 408. Further, the PSE control circuit 426 is adapted to receive control signals from the multiplexer 424. In this particular example, the PSE control circuit 426 is on the same side of the isolation barrier 422 and the PHY circuits 434, 436, and 438. To further illustrate the electrical isolation provided by the isolation barrier 422, a dashed line 425 is shown illustrating a partition between the electrically isolated circuitry and the other circuitry, such as the PSE control circuit 426.

In a particular embodiment, over-voltage and/or surge protection circuitry (not shown) may be coupled to the I/O interfaces 414, 416, and 418 to prevent a power surge from reaching the control circuit 410. In another particular embodiment, the shared isolation barrier 422 can be a digital isolation barrier circuit that is adapted to electrically isolate the MAC circuit 420 from the PHY circuits 414, 416, and 418. In a particular example, the shared isolation barrier 422 is a capacitor having a first terminal 423 coupled to the multiplexer 424 via a first media independent interface (MII) and a second terminal 421 coupled to the MAC circuit 420 via a second MII. In a particular embodiment, the first and second MII interfaces can be serializer/deserializer (SerDes) interfaces for analog implementations. In another particular embodiment, the first and second MII interfaces can be parallel MII interfaces, including, for example, a Gigabit MII (GMII) interface, a Reduced GMII (RGMII) interface, or another high speed interface. In another particular example, the isolation barrier 422 can include another high speed digital isolation barrier, such as a radio frequency (RF) isolation circuit, a digital pulse transformer, other high speed digital isolation circuits, or any combination thereof. In a particular example, by sharing the isolation barrier 422, the overall circuit area of the control circuit 410 is reduced, relative to a control circuit including separate isolation barriers for each of the PHY circuits 434, 436, and 438. Further, overall costs of the control circuit 410 are reduced. Additionally, overall power consumption relative to a multiple isolation barrier implementation may also be reduced.

In a particular example, since separate isolation barriers are not needed for each channel of the PHY circuits 434, 436, and 438, the PHY circuits 434, 436, and 438 can be integrated with the PSE control circuit 426 in a single integrated circuit package. In another particular example, the single integrated circuit package having PHY circuits 434, 436, and 438 can also include high density logic integrated circuitry and high voltage analog integrated circuitry. In a particular example, PHY circuits, such as the PHY circuits 434, 436, and 438, can tend to dissipate enough power to warrant heat sinking, which makes additional power consumed by an integrated PSE circuit. Further, the isolation barrier can be integrated into the PHY/PSE integrated circuit package by using a high speed digital isolation technique, such as radio frequency isolation, pulse transformer isolation, capacitive isolation, other high speed digital isolation, or any combination thereof. In general, by combining the PHY, the PSE circuitry, and other circuits into a single integrated circuit package, less printed circuit board area is consumed due to transformer elimination and integrated circuit combinations. Further, the resulting circuit can be produced at a reduced cost and with tighter, better controlled coupling between the power and data provided to particular ports.

Figure 5:
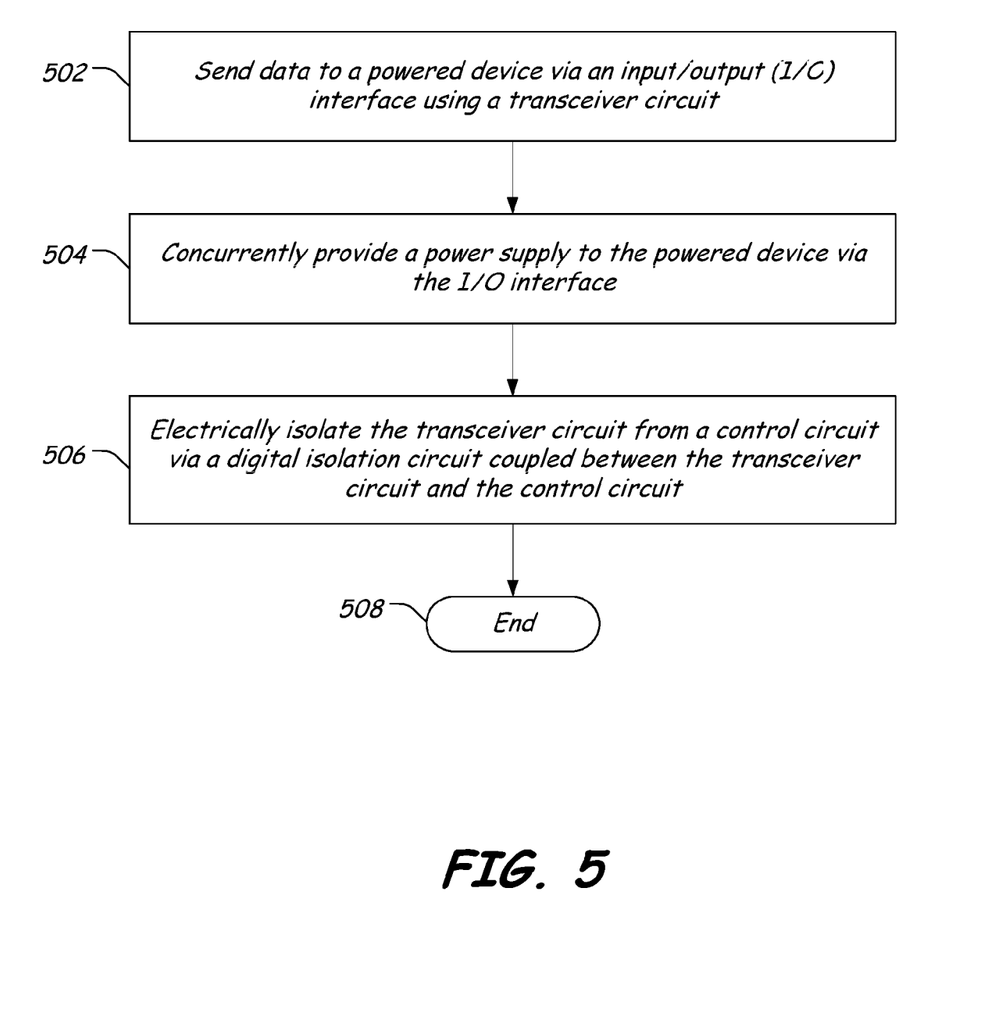
FIG. 5 is a flow diagram of a particular illustrative embodiment of a method of providing electrical isolation.

FIG. 5 is a flow diagram of a particular illustrative embodiment of a method of providing electrical isolation. At 502, data is sent to a powered device via an input/output (I/O) interface using a transceiver circuit. Advancing to 504, a power supply is concurrently provided to the powered device via the I/O interface. Proceeding to 506, the transceiver circuit is electrically isolated from a control circuit via a digital isolation coupled between the transceiver circuit and the control circuit. In a particular embodiment, the transceiver circuit and the control circuit are integrated in a single integrated circuit package. The method terminates at 508.

In a particular embodiment, the method further includes sending data to a second powered device via a second I/O interface using a second transceiver circuit, concurrently providing a second power supply to the second powered device via the second I/O interface, and electrically isolating the second transceiver circuit from the control circuit via the digital isolation barrier circuit. In a particular example, the transceiver circuit and the second transceiver circuit are coupled to the first terminal of the digital isolation barrier via a multiplexer circuit. In another particular embodiment, the method further includes isolating the transceiver circuit from a direct current received via the network I/O interface using one or more capacitors.

Figure 6:
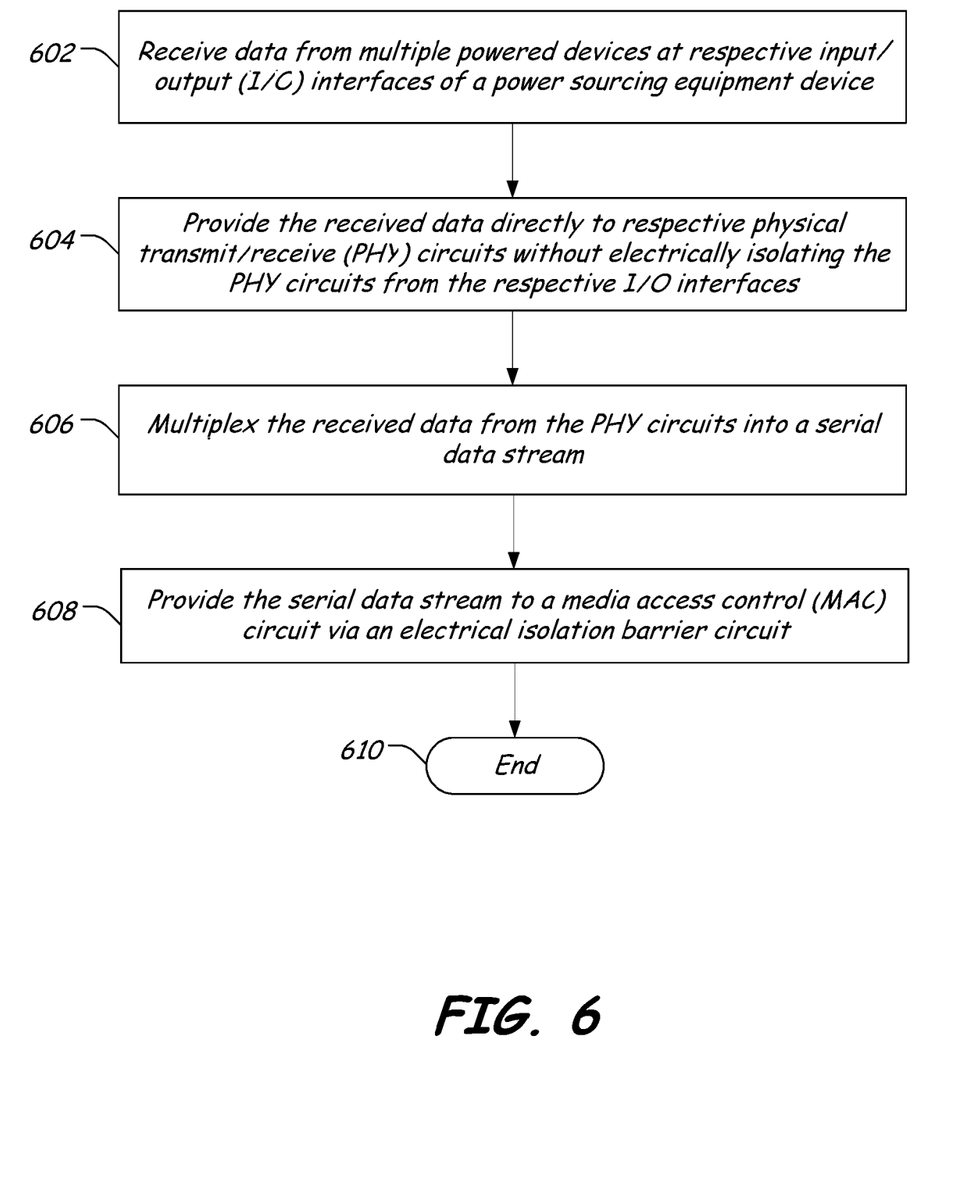
FIG. 6 is a flow diagram of a second particular illustrative embodiment of a method of providing electrical isolation.

FIG. 6 is a flow diagram of a second particular illustrative embodiment of a method of providing electrical isolation. At 602, data is received from multiple powered devices at respective input/output (I/O) interfaces of a power sourcing equipment device. Advancing to 604, the received data is provided directly to respective physical transmit/receive (PHY) circuits without electrically isolating the PHY circuits from the respective I/O interfaces. Continuing to 606, the received data from the PHY circuits are multiplexed into a serial or parallel data stream. Proceeding to 608, the serial or parallel data streams are provided to a media access control (MAC) circuit via an electrical isolation barrier circuit. The method terminates at 610.

In a particular embodiment, a de-serialize or de-multiplex operation may be performed prior to providing the data to the MAC circuit. In another particular embodiment, the electrical isolation barrier circuit includes a single digital isolation barrier circuit having a first terminal that is coupled to a multiplexer to receive the serial data stream and having a second terminal that is coupled to the MAC circuit (or to a de-multiplexer).

In conjunction with the circuit devices, systems, and methods described above, a physical transport layer (PHY) circuit can be coupled to an input/output (I/O) interface without electrically isolating the PHY circuit from the I/O interface. Further, by moving the isolation barrier to a position between the PHY circuit and control circuitry, electrical isolation of the circuit device is maintained while reducing transmit/receive power consumption. Additionally, the isolation barrier can be shared by multiple PHY circuits, thereby reducing overall circuit area usage and circuit costs.

Although the present invention has been described with reference to preferred embodiments, workers skilled in the art will recognize that changes may be made in form and detail without departing from the spirit and scope of the invention.

What is claimed is:

1. A power sourcing equipment (PSE) device comprising:
   a plurality of network input/output (I/O) interfaces adapted to physically and electrically connect to a respective plurality of cables;
   a plurality of driver circuits, each of the plurality of driver circuits adapted to transmit data to and receive data from a respective network I/O interface of the plurality of network I/O interfaces; and
   a shared isolation barrier to electrically isolate control circuitry from the plurality of driver circuits, the shared isolation barrier comprising:
      a first SERDES (serializer/deserializer) circuit coupled to the plurality of driver circuits;
      a second SERDES circuit coupled to the control circuitry; and
      a digital isolation barrier including a first terminal coupled to the first SERDES circuit and including a second terminal coupled to the second SERDES circuit.

2. The PSE device of claim 1, further comprising a power sourcing equipment (PSE) control circuit coupled to the plurality of driver circuits without electrical isolation, the PSE control circuit adapted to perform powered device detection by applying a powered device detection signal to a selected network I/O interface of the plurality of network I/O interfaces and by detecting a responsive signal at the selected network I/O interface to determine whether a powered device is coupled to the selected network I/O interface.

3. The PSE device of claim 1, further comprising a plurality of capacitors to block a direct current (DC) between the plurality of network I/O interfaces and the plurality of driver circuits without blocking data.

4. The PSE device of claim 1, wherein each driver circuit of the plurality of driver circuits is coupled to a respective network I/O interface by multiple wire pairs.

5. The PSE device of claim 4, further comprising:
   a power injector to provide a direct current power supply; and
   a plurality of choke circuits coupled between wire pairs of the multiple wire pairs and adapted to couple the power injector to the wire pairs, the plurality of choke circuits to provide alternating current (AC) blocking to prevent power supply noise from interfering with data flow and to reduce attenuation of data signal amplitude by a power supply ground while allowing direct current to flow to the plurality of network I/O interfaces.

6. The PSE device of claim 5, further comprising a power sourcing equipment (PSE) circuit adapted to control the power injector to selectively provide a power supply to one or more of the plurality of network I/O interfaces.

7. A system comprising:
   a plurality of network input/output (I/O) interfaces, each network I/O interface of the plurality of network I/O interfaces adapted to couple to a cable having multiple wires to carry power and data;
   a physical transport (PHY) circuit including transmit and receive circuitry coupled to each of the plurality of network I/O interfaces via multiple wire pairs to send and receive data via the cable;
   a power supply circuit coupled to each of the plurality of network I/O interfaces and adapted to apply power to the cable via the network I/O interface;
   an isolation barrier coupled between the PHY circuit and control circuitry to electrically isolate the control circuitry from the PHY circuit without isolating the PHY circuit from the plurality of network I/O interfaces, wherein the isolation barrier comprises a digital isolation barrier;
   a first multiplexer circuit coupled to the PHY circuit via a media independent (MII) interface and coupled to a first terminal of the digital isolation barrier;
   a second multiplexer circuit coupled to the control circuit via a second media independent (MII) interface and to a second terminal of the digital isolation barrier; and
   wherein the first and second multiplexer circuits are adapted to transmit MII signals across the digital isolation barrier.

8. The system of claim 7, further comprising a direct current (DC) block circuit between the PHY circuit and one of the plurality of network I/O interfaces to prevent a direct current from reaching the PHY circuit from the one of the plurality network I/O interfaces while allowing data to pass.

9. The system of claim 8, wherein the DC block circuit comprises one or more capacitors.

10. The system of claim 7, further comprising choke circuitry including inductor pairs coupled between wires of the multiple wire pairs, the choke circuitry to couple the power supply circuit to the multiple wire pairs and to block alternating current (AC) flow to prevent disruption of the data.

11. The system of claim 7, further comprising a switching field effect transistor (PET) responsive to the control circuitry to selectively apply the power to the cable of one of the plurality of network I/O interfaces.

12. The system of claim 7, further comprising power sourcing equipment (PSE) circuitry coupled to the PHY circuit without isolation, the PSE circuitry adapted to perform powered device detection and classification operations to detect and determine a power requirement of a powered device coupled to one of the plurality of network I/O interfaces.

13. The system of claim 7, wherein the PHY circuit, the isolation barrier, and the control circuitry comprise a single integrated circuit package.

14. A method of providing electrical isolation, the method comprising:

sending data to a powered device via an input/output (I/O) interface using a transceiver circuit of a plurality of transceiver circuits of an integrated circuit;

concurrently providing a power supply to the powered device via the I/O interface;

electrically isolating the plurality of transceiver circuits from a control circuit via a digital isolation circuit coupled between the plurality of transceiver circuits and the control circuit;

sending data to a second powered device via a second I/O interface using a second transceiver circuit of the plurality of transceiver circuits;

concurrently providing a second power supply to the second powered device via the second I/O interface; and electrically isolating the second transceiver circuit from the control circuit via the digital isolation circuit; and wherein the transceiver circuit and the second transceiver circuit are coupled to the digital isolation circuit via a multiplexer circuit.

15. The method of claim 14, further comprising blocking a direct current (DC) signal from reaching the transceiver circuit using one or more capacitors.

16. The method of claim 14, wherein the transceiver circuit and the control circuit are integrated in a single integrated circuit package.

17. A power sourcing equipment (PSE) device comprising:
a plurality of network input/output (I/O) interfaces adapted to physically and electrically connect to a respective plurality of cables;
a plurality of driver circuits, each of the plurality of driver circuits adapted to transmit data to and receive data from a respective network I/O interface of the plurality of network I/O interfaces;
a shared isolation barrier to electrically isolate control circuitry from the plurality of driver circuits, the shared isolation barrier comprising:
a first parallel input/output (I/O) interface coupled to the plurality of driver circuits;
a second parallel I/O interface coupled to the control circuitry; and
a digital isolation barrier including a first terminal coupled to the first parallel I/O interface and including a second terminal coupled to the second parallel I/O interface.

18. The PSE device of claim 17, further comprising a power sourcing equipment (PSE) control circuit coupled to the plurality of driver circuits without electrical isolation, the PSE control circuit adapted to perform powered device detection by applying a powered device detection signal to a selected network I/O interface of the plurality of network I/O interfaces and by detecting a responsive signal at the selected network I/O interface to determine whether a powered device is coupled to the selected network I/O interface.

19. The PSE device of claim 17, further comprising a plurality of capacitors to block a direct current (DC) between the plurality of network I/O interfaces and the plurality of driver circuits without blocking data.

20. The PSE device of claim 17, wherein each driver circuit of the plurality of driver circuits is coupled to a respective network I/O interface by multiple wire pairs.

21. The PSE device of claim 20, further comprising:
a power injector to provide a direct current power supply; and
a plurality of choke circuits coupled between wire pairs of the multiple wire pairs and adapted to couple the power injector to the wire pairs, the plurality of choke circuits to provide alternating current (AC) blocking to prevent power supply noise from interfering with data flow and to reduce attenuation of data signal amplitude by a power supply ground while allowing direct current to flow to the plurality of network I/O interfaces.

22. The PSE device of claim 21, further comprising a power sourcing equipment (PSE) circuit adapted to control the power injector to selectively provide a power supply to one or more of the plurality of network I/O interfaces.

* * * * *